United States Patent [19]
Itoh et al.

[11] Patent Number: 5,343,264
[45] Date of Patent: Aug. 30, 1994

[54] CAMERA USING FILM HAVING MAGNETIC RECORDING PORTION

[75] Inventors: Junichi Itoh; Masahiro Dai; Yoji Watanabe, all of Tokyo, Japan

[73] Assignee: Olympus Optical Co., Ltd., Tokyo, Japan

[21] Appl. No.: 80,227

[22] Filed: Jun. 21, 1993

[30] Foreign Application Priority Data

Jun. 25, 1992 [JP] Japan .................. 4-167463

[51] Int. Cl.⁵ .............. G03B 17/24; G03B 29/00; G03B 17/26; G03B 17/00
[52] U.S. Cl. ........................... 354/106; 354/76; 354/275; 354/289.1
[58] Field of Search .......... 354/76, 105, 106, 217, 354/218, 275, 471-475, 289.1; 360/128, 137

[56] References Cited

U.S. PATENT DOCUMENTS

| | | | |
|---|---|---|---|
| 3,078,759 | 2/1963 | Brunswick | 354/76 |
| 4,860,037 | 8/1989 | Harvey | 354/105 X |
| 4,864,332 | 9/1989 | Harvey | 354/105 X |
| 5,136,317 | 8/1992 | Goto et al. | 354/76 X |

*Primary Examiner*—Michael L. Gellner
*Assistant Examiner*—Jae N. Noh
*Attorney, Agent, or Firm*—Frishauf, Holtz, Goodman & Woodward

[57] ABSTRACT

This invention relates to a camera using a film having a magnetic recording portion, which has magnetic heads for recording/reading data on/from a magnetic recording portion formed on part of a photosensitive film, which magnetic heads can be urged/withdrawn against/from the film. In this camera, data representing the number of times that a film feed operation or a photographic operation is performed is stored in a storage unit, and necessity to clean the magnetic heads is determined on the basis of the data. If it is determined that cleaning must be performed, a warning unit performs a warning display or inhibits a photographic operation.

43 Claims, 8 Drawing Sheets

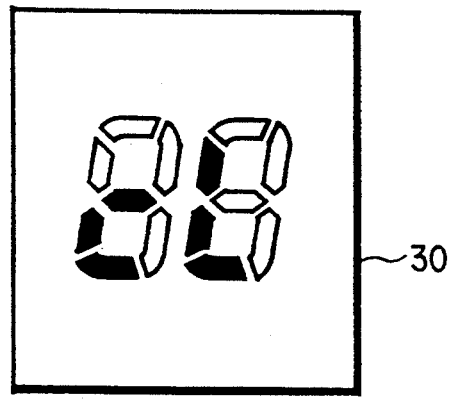
F I G. 7
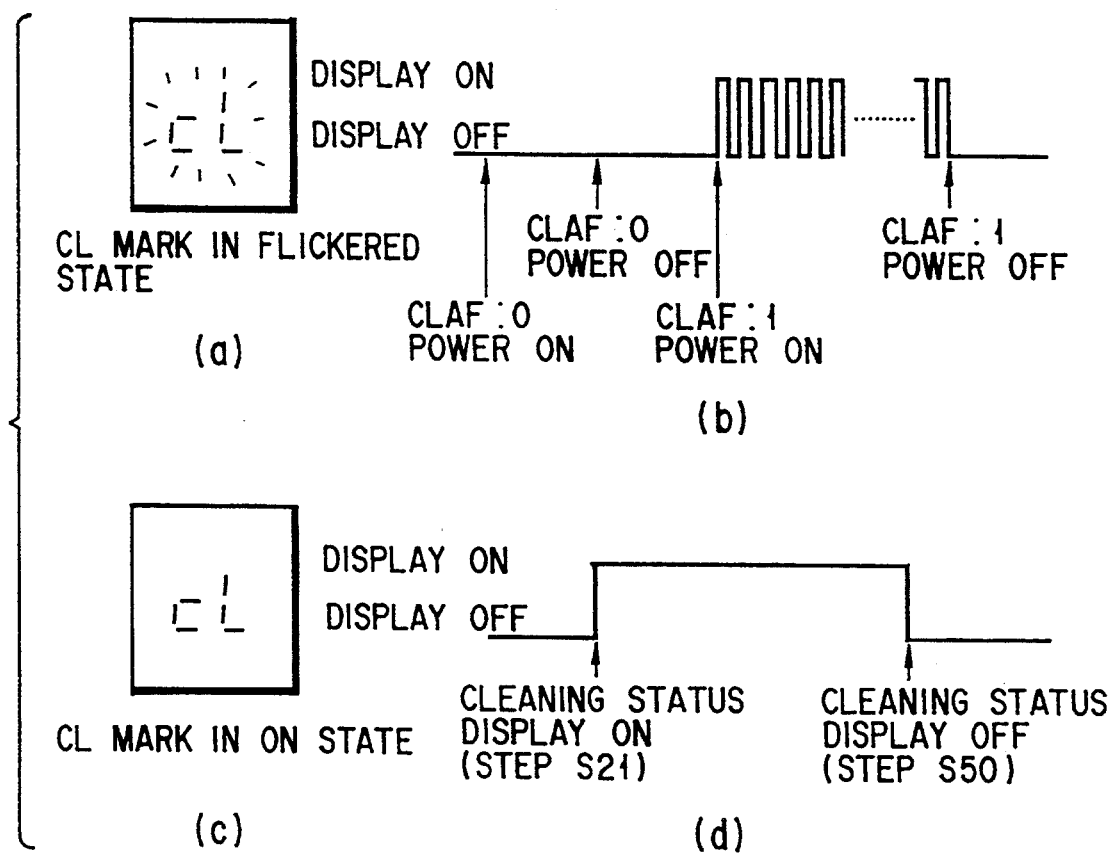
F I G. 8

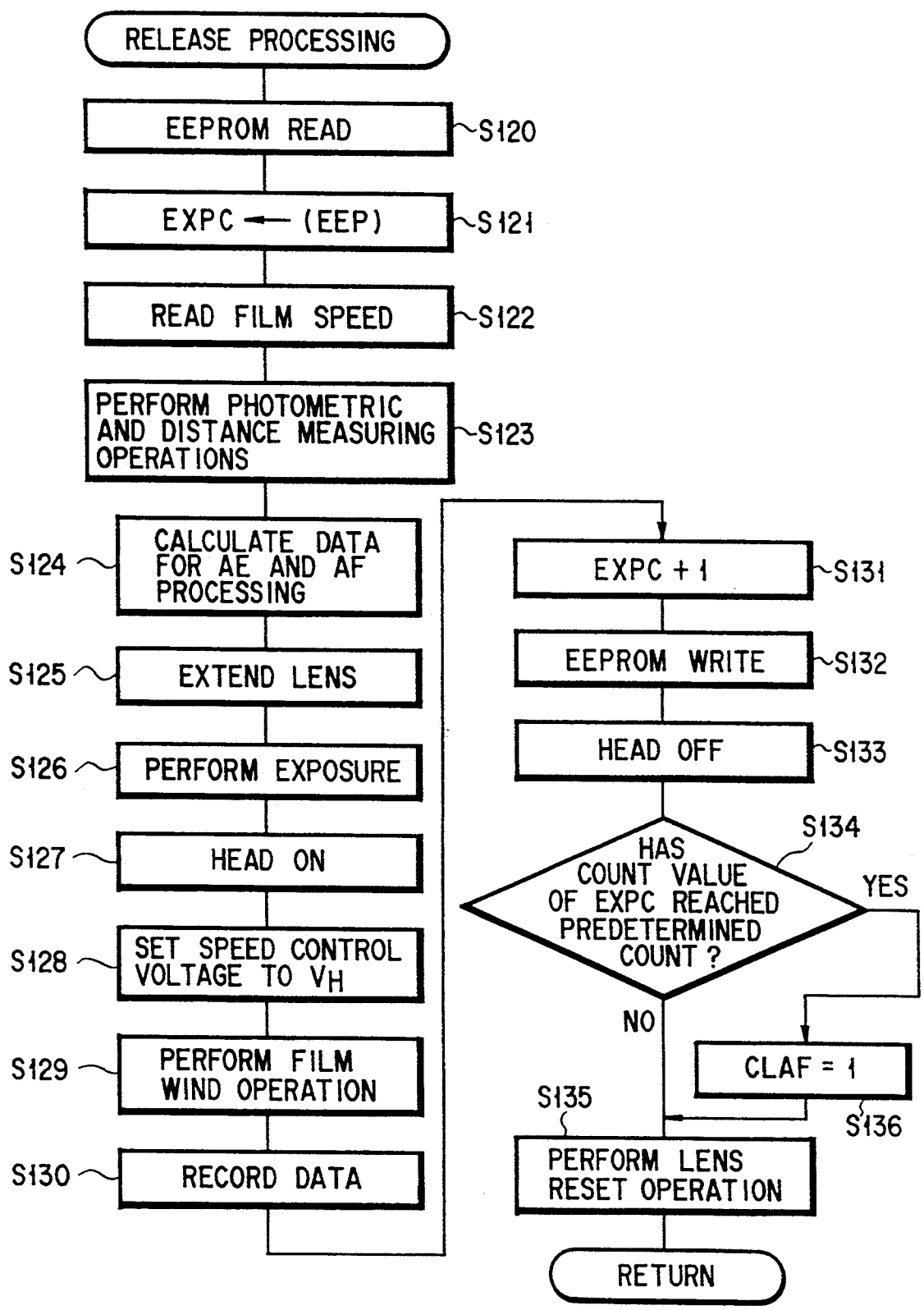
F I G. 9

CAMERA USING FILM HAVING MAGNETIC RECORDING PORTION

BACKGROUND OF THE INVENTION

1. Field of the Invention

The present invention relates to the prevention of operation errors such as recording/reproduction errors due to contamination of a magnetic head arranged in a camera using a film having a magnetic recording portion.

2. Description of the Related Art

As described in U.S. Pat. No. 5,136,317, a conventional camera has a magnetic head capable of recording-/reproducing photographic data and the like on/from a magnetic recording portion formed on a film loaded in the camera.

In this camera, the magnetic head is used to record or reproduce data associated with photography on or from a magnetic track portion every time photography is performed. In general, as a magnetic head is used, a magnetic substance is cut from a magnetic track and adheres to the magnetic head surface, and the contact of the magnetic head with the magnetic track portion becomes unstable, resulting in faulty recording and reproducing operations. For this reason, the contaminated state of the magnetic head must be checked, and the magnetic head must be cleaned as needed.

In order to determine the necessity of this cleaning operation, dummy data is recorded on the magnetic track before photography. After photography is performed to a certain extent, the dummy data is reproduced to be compared with the dummy data recorded beforehand. If these data do not coincide with each other, it is determined that the magnetic head is contaminated, and a warning is provided in the form of a display or the like.

In the above-described method of determining the contaminated state of the magnetic head, however, a "film advance" operation must be performed to record dummy data during loading of a film, and a film rewind operation must be performed to reproduce the dummy data. Such an operation for determination of a contaminated state is time-consuming and cumbersome for the photographer.

SUMMARY OF THE INVENTION

It is, therefore, an object of the present invention to provide a camera using a film having a magnetic recording portion, which can easily determine the contaminated state of a magnetic recording head, and can prevent recording/reproduction errors due to contamination of the head.

According to the first aspect of the present invention, there is provided a camera using a film having a magnetic recording portion, comprising a magnetic head for recording photographic data on the magnetic recording portion, cleaning film detecting means for detecting that a cleaning film for cleaning the magnetic head is loaded, cleaning control means for cleaning the magnetic head by using the cleaning film when the cleaning film detecting means detects that the cleaning film is loaded, storage means for counting frames which have undergone photography and storing a cumulative frame count, comparing means for comparing the cumulative frame count stored in the storage means with a predetermined value, means for performing a warning display or inhibiting a release operation when the comparing means determines that the cumulative frame count exceeds the predetermined value, and reset means for resetting the cumulative frame count stored in the storage means upon completion of the cleaning operation.

According to the second aspect of the present invention, there is provided a camera using a film having a magnetic recording portion, comprising a magnetic head which is brought into contact with the film, feed start signal output means for outputting a signal for instructing to start a feed operation of the film after the film is loaded, determining means for determining whether the loaded film is a cleaning film for cleaning the magnetic head, and film feed means, started to operate in response to an output from the feed start signal output means, for performing a feed operation for cleaning the magnetic head when the determining means determines that the loaded film is a cleaning film, and performing a normal film feed operation when the determining means determines that the loaded film is not a cleaning film, wherein the film feed means sets a feed speed of the cleaning film to be lower than the normal film feed speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view showing an LCD segment display sample indicating a cleaning warning or cleaning status;

FIG. 8 shows different views illustrating display samples indicating a cleaning warning status and a cleaning status; and FIG. 9 is a flow chart showing a subroutine "release processing".

DETAILED DESCRIPTION OF THE PREFERRED EMBODIMENTS

An embodiment of the present invention will be described below with reference to the accompanying drawings.

Figure 1:
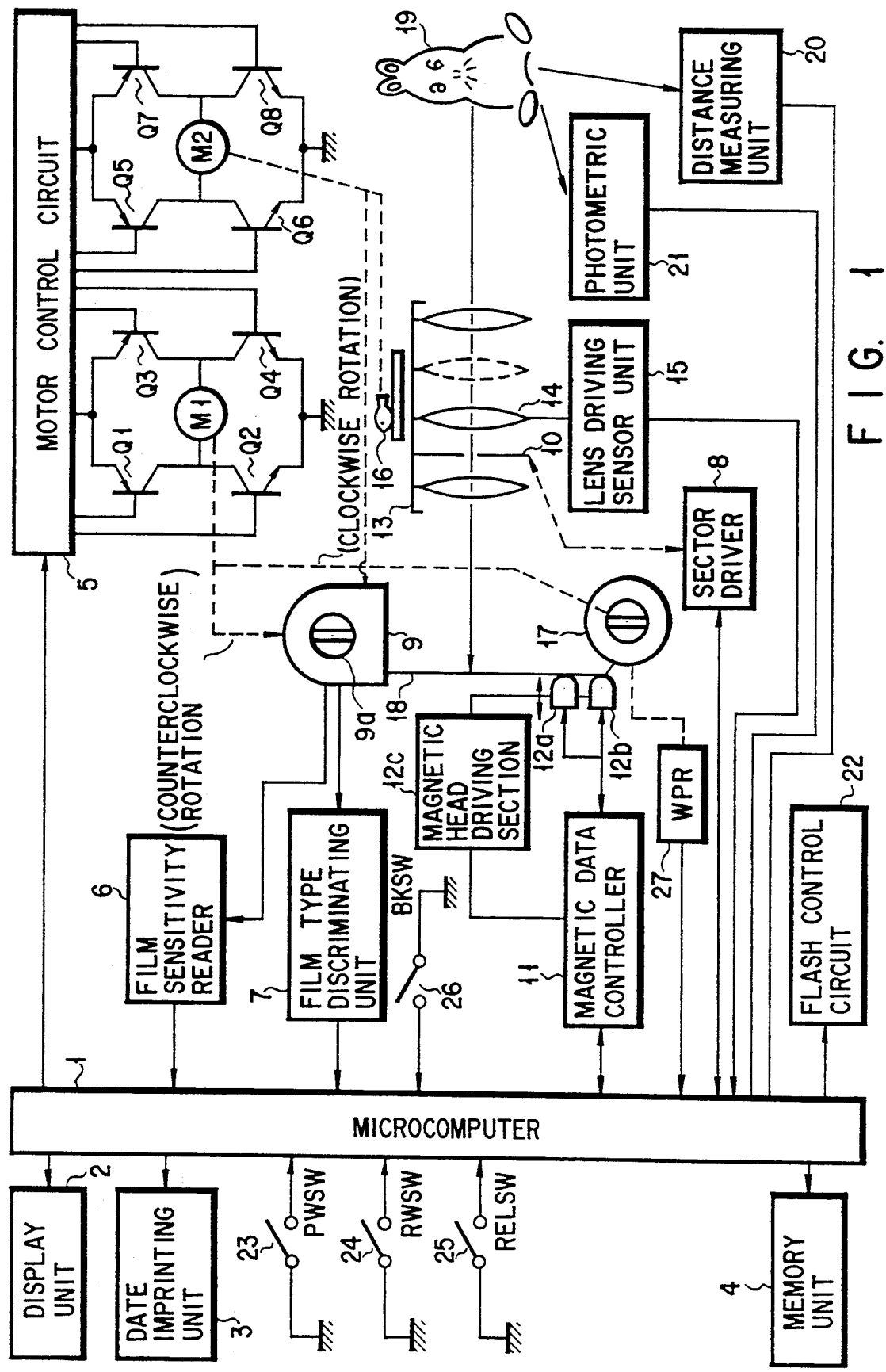
FIG. 1 is a block diagram showing the circuit arrangement of a camera using a film having a magnetic recording portion according to the first embodiment of the present invention.

FIG. 1 shows the circuit arrangement of a camera using a film having a magnetic recording portion according to the first embodiment of the present invention.

This camera includes a microcomputer 1 for controlling the overall camera. A display unit 2, a data imprinting unit 3, and a storage unit 4 are connected to the microcomputer 1. The display unit 2 displays a frame count, a magnetic head cleaning warning, a magnetic head cleaning operation, and the like by using a liquid crystal display (LCD). The data imprinting unit 3 imprints a date on a film. The storage unit 4 serves to store frame count data, various adjustment values, status flag data, perforation count values, and the like. As the storage unit 4, for example, an EEPROM capable of electrically erasing data is used.

A motor control circuit 5 is also connected to the microcomputer 1. The motor control circuit 5 decodes signals sent from the microcomputer 1 to set motor voltages for driving motors M1 and M2 and select a motor to be driven and its operation (rotating, reversing, decelerating, or stopping).

Motor bridge circuits respectively constituted by transistors Q1 to Q4 and transistors Q5 to Q8 are connected between the motor control circuit 5 and the motors M1 and M2. With these motor bridge circuits, the motor M1 is rotated clockwise when the transistors Q1 and Q4 are turned on; rotated counterclockwise when the transistors Q2 and Q3 are turned on; and decelerated when the transistors Q2 and Q4 are turned on.

The motor M2 is rotated clockwise when the transistors Q5 and Q8 are turned on; rotated counterclockwise when the transistors Q6 and Q7 are turned on; and decelerated when the transistors Q6 and Q8 are turned on.

A film sensitivity reader 6, a film type discriminating unit 7, and a sector driver 8 are also connected to the microcomputer 1. The film sensitivity reader 6 reads film sensitivity data and frame count data on a film magazine 9 and transmits these data to the microcomputer 1.

The film type discriminating unit 7 discriminates whether a loaded film is a photographic film or a film for cleaning the magnetic head, and transmits the resultant data to the microcomputer 1. In this discrimination scheme, for example, a film type may be determined on the basis of the shape of the film magazine 9 or may be recognized on the basis of an electric contact specially designed for discrimination and formed on a circumferential portion of the film magazine 9 or a combination of non-existent contacts at a terminal DX.

The sector driver 8 opens/closes a sector 10 upon reception of a control signal from the microcomputer 1 and transmits data indicating the open/closed state of the sector 10 to the microcomputer 1. A magnetic head controller 11 causes a magnetic head driving section 12c in accordance with an instruction from the microcomputer 1 to urge/withdraw (ON/OFF) magnetic heads 12a and 12b against/from a film. While the magnetic heads 12a and 12b are in tight contact with the film, a recording/reproducing operation is performed by the magnetic heads 12a and 12b.

In a photographic lens group barrel 13, a focusing lens 14, a lens drive detector 15, a gear 16, and the sector 10 are arranged. The lens drive detector 15 converts the movement of the focusing lens 14 into a pulse signal and transfers the signal to the microcomputer 1.

The gear 16 serves to transmit a driving force from the motor M2 to drive the focusing lens 14. The sector 10 serves to control an exposure amount.

The film magazine 9 for housing a film and a wind-up spool 17 are arranged in the camera. Near these components, there is provided a mechanism designed such that a film or a cleaning film 18 in the film magazine 9 is fed toward the wind-up spool 17 by a driving mechanism (not shown) upon counterclockwise rotation of the motor M2, and the wind-up spool 17 is driven by a driving mechanism (not shown) upon clockwise rotation of the motor M1.

In addition, there is provided a mechanism designed such that the film or the cleaning film 18 is rewound into the film magazine 9 by a driving mechanism (not shown) upon counterclockwise rotation of the motor M1.

A distance measuring unit 20, a photometric unit 21, and an electronic flash controller 22 are connected to the microcomputer 1. The distance measuring unit 20 serves to measure the distance to an object 19 to be photographed. The photometric unit 21 serves to measure the brightness of the object 19. A power switch (PWSW) 23, a film halfway rewind switch (RWSW) 24, a release switch (RELSW) 25, and a rear cover detection switch (BKSW) 26 are connected to the microcomputer 1. When the PWSW 23 is turned on, a photographic operation can be performed. The RELSW 25 is used to perform an exposure operation. The BKSW 26 is turned on in accordance with the open/closed state of the rear cover, thus detecting the open/closed state of the rear cover. A photoreflector (WPR) 27 is also connected to the microcomputer 1. The WPR 27 serves to detect perforations of a film.

An operation of the camera using a film having a magnetic recording portion, which camera has the above-described arrangement, will be described below with reference to the flow chart shown in FIG. 2.

Figure 2:
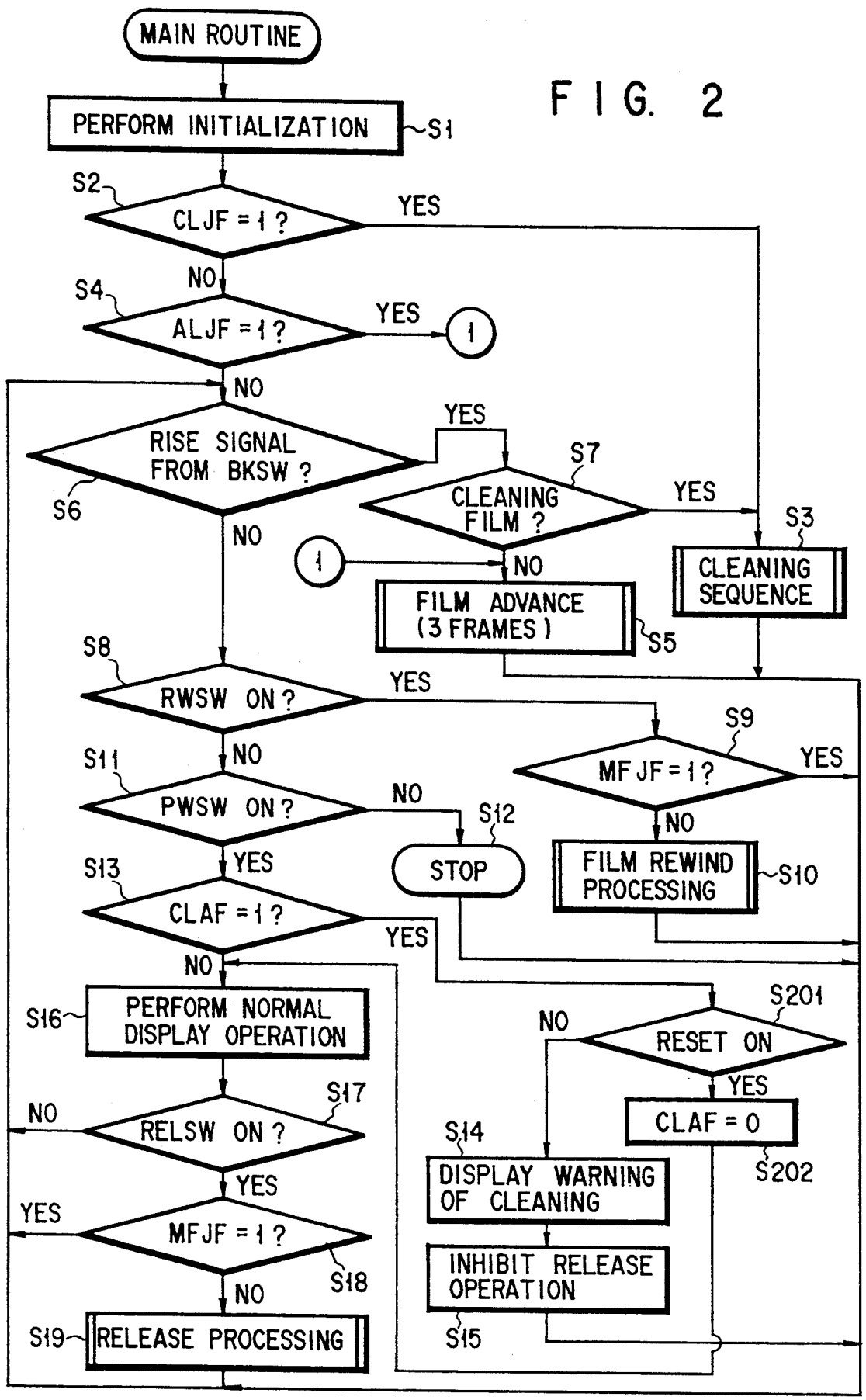
FIG. 2 is a flow chart showing an operation of the camera using a film having a magnetic recording portion in FIG. 1.

When a battery is mounted in the main body of the camera using a film having a magnetic recording portion, and power is supplied to the camera, the microcomputer 1 executes the main routine shown in FIG. 2.

First, a port set operation for the microcomputer 1 and a system reset operation for, e.g., a read operation of the EEPROM in the storage unit 4 are performed to execute initialization (step S1).

Subsequently, it is checked whether a cleaning status flag CLJF is "1" (step S2). If it is "1" (YES), a cleaning sequence is executed (step S3). If the cleaning status flag CLJF is "0" (NO), it is checked whether an "automatic loading" (automatically advances to first frame when camera back is closed) status flag ALJF is "1" (step S4). If "1" (YES) is determined in step S4, the flow advances to step S5 to execute an "automatic loading" operation. If "0" (NO) is determined in step S4, the flow advances to step S6 to detect the open/closed state of the rear cover by checking the presence/absence of a rise signal from the BKSW 26. In this case, if the rise signal is output (YES), it indicates that the state of the rear cover changes from the open state to the closed state. It is then checked by the film type discriminating unit 7 whether the loaded film is a photographic film or a cleaning film (step S7). If the loaded film is a cleaning film (YES), the flow advances to step S3 to execute the cleaning sequence. If it is not a cleaning film (NO), the flow advances to step S5 as a subroutine "automatic loading processing".

If it is determined in step S6 that no rise signal from the BKSW 26 is detected (NO), it is checked whether the RWSW 24 is ON (step S8). If the RWSW 24 is ON (YES), a rewind completion flag MFJF is checked (step S9). If "1" (YES) is determined in step S9, the flow returns to step S6. If "0" (NO) is determined in step S9, the flow advances to step S10 as a subroutine "film rewind processing".

The rewind completion flag MFJF is a flag for inhibiting a release operation and a film rewind operation when the film is completely rewound. Although not shown in this flow chart, the rewind completion flag MFJF is reset to "0" and written in the EEPROM when it is determined that a rise signal from the BKSW 26 is detected.

If it is determined in step S8 that the RWSW 24 is not ON (NO), it is checked whether the PWSW 23 is ON (step S11). If the PWSW 23 is OFF (NO), all the camera operations are stopped to set the camera in a stopped state (step S12). If the PWSW 23 is On (YES), it is checked whether a magnetic recording/reproducing operations performed after photography corresponding to a predetermined number of frames is completed, or the number of times of the "automatic loading" subroutines executed (step S5), i.e. the number of times of film loading operations, or the number of times the rewind flag "1" is set, i.e. the number of times of rewind operations, is determined. That is, it is checked whether a cleaning warning flag CLAF for warning of a cleaning period of the magnetic heads 12a and 12b is "1" (step S13). If "1" (YES) is determined in step S13, it is determined whether the reset SW for forcibly resetting the cleaning warning flag CLAF is ON or OFF (step S201). If YES in step S201, the cleaning warning flag CLAF is reset to "0" (step S202) and the flow advances to step S16. If NO in step S201, the flow advances to step S14 to cause the display unit 2 to display a cleaning warning (step S14). Thereafter, a release operation is inhibited (step S15). If "0" (NO) is determined in step S13, a frame count or the like is displayed on the display unit 2 (step S16). Thereafter, it is checked whether the RELSW 25 is ON (step S17). If it is determined in step S17 that the RELSW 25 is ON (YES), the rewind completion flag MFJF is checked (step S18).

If it is determined in step S18 that the rewind completion flag MFJF is "1" (YES), the flow returns to step S6. If NO in step S18, release processing is performed (step S19), and the flow subsequently returns to step S6.

The cleaning warning flag CLAF will be described below.

As data associated with each photographic operation is repeatedly recorded/reproduced on/from the magnetic recording portion of the photographic film 18 by using the magnetic heads 12a and 12b, a magnetic substance is cut from the magnetic recording portion and adheres to the surfaces of the heads, and the contact of the magnetic heads 12a and 12b with the magnetic recording portion becomes unstable, resulting in faulty recording/reproducing operations. The cleaning warning flag CLAF serves to warn the camera user about the impossibility of recording/reproducing operations by, e.g., displaying a warning or generating a warning sound. In step S201, the mechanism is provided for forcibly resetting the cleaning warning flag CLAF, in order to forcibly enable photographing. The reason for this is that if the normal recording/reproducing operation of magnetic heads 12a and 12b is disabled, the photographing by the camera is disabled, but, in some cases, the photographing needs to be continued in actual use.

A cleaning operation of the camera using a film having a magnetic recording portion (step S3 in FIG. 2) will be described in detail next with reference to the flow charts shown in FIGS. 3A and 3B.

First, the display unit 2 is caused to display that the camera is in a cleaning status (step S21). After data is read out from the storage unit 4 (e.g., an EEPROM) (step S22), it is checked whether the cleaning status flag CLJF is "1" (step S23). The cleaning status flag CLJF is stored in the EEPROM 4. Even if, therefore, a battery or the like is removed from the camera during a cleaning operation and is subsequently mounted therein again, the cleaning operation can be resumed upon detection of this flag. A display of a cleaning status will be described later.

If it is determined in step S23 that the cleaning status flag CLJF is "1" (YES), the data stored in the EEPROM 4 is transferred to a cleaning counter CLC (step S24). If it is determined in step S23 that the cleaning status flag CLJF is "0" (NO), the flow advances to step S25 to clear a previously set cleaning status flag OCLJF. The flag OCLJF is a flag for determining whether to perform a film feed operation again, if the film feed amount is short, a perforation is broken, or the film is not properly wound around the spool when a "film advance" operation for cleaning is performed by using a film magazine such as the one shown in FIG. 4.

Figure 4:
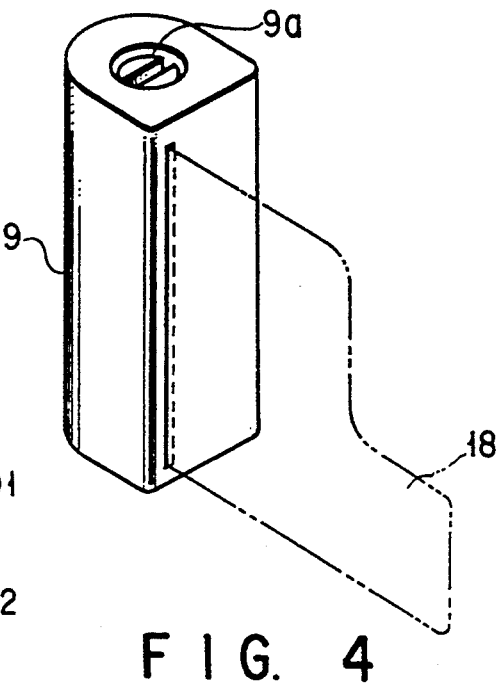
FIG. 4 is a perspective view showing the arrangement of a film magazine.

The film magazine 9 shown in FIG. 4 is designed such that the film 18 is rewound into the film magazine 9 by rotating a spool 9a clockwise and is fed therefrom by rotating the spool 9a counterclockwise.

The motor M2 is rotated counterclockwise to feed the cleaning film from the film magazine 9 to such an extent that the film is wound around the wind-up spool 17 (step S26). In order to count the number of frames subjected to a "film advance" operation, the cleaning counter CLC is cleared (step S27). The cleaning status flag CLJF (step S28) is set to "1", and this status is stored in the EEPROM (step S29).

After the above-mentioned initialization is completed, the magnetic head 12a and 12b are urged against the cleaning film 18 (to be referred to as "head ON" hereinafter) by the magnetic head controller 11 (step S30).

In this embodiment, the film feed speed is set to be lower than a normal wind-up speed to reduce wear of the surfaces of the magnetic heads 12a and 12b due to a feed operation of the cleaning film 18.

In order to control the feed speed of the cleaning film, the voltage set value of the motor control circuit 5 is set to be a value causing the feed speed of the cleaning film to be lower than that of a photographic film (step S31).

The motor M1 is driven clockwise by using such a voltage to wind up the cleaning film (step S32). When the motor M1 is rotated clockwise, the spool 17 is rotated by a driving mechanism (not shown). A time $T_{CL}$ is set in a timer, which time is long enough to cause a film end to be hooked on a pawl (not shown) on the spool 17 so as to wind up the film after the motor M1 is rotated (step S33). The perforation counter PFC is cleared (step S34). Thereafter, a signal from the WPR 27 for detecting the movement of perforations is checked (step S35).

If it is determined in step S35 that a rise signal from the WPR 27 is detected (YES), "1" is added to the count value of the perforation counter PFC (step S36). It is then checked whether this count value has reached "8" (step S37). Note that in this embodiment, the count value "8" corresponds to one frame.

If it is determined in step S37 that the count value is less than "8" (NO), it is determined that the film is not wound by one frame, and the flow returns to step S35. If it is determined in step S37 that the count value has reached "8" (YES), "1" is added to the cleaning counter CLC (step S38). After the number of frames which have undergone the "film advance" operation is written in the EEPROM 4 (step S39), it is checked whether the number of frames fed for cleaning has reached a predetermined frame count (step S40).

If it is determined in step S40 that the number of frames fed for cleaning has not reached the predetermined frame count (NO), a time TW normally required to wind a film by one frame is set in the timer again (step S41). After the timer is started, the flow returns to step S34. If it is determined in step S40 that the count value of the cleaning counter CLC has reached the predetermined frame count (YES), the motor M1 is decelerated (step S42) and is subsequently turned off (step S43). The cleaning status flag CLJF is then cleared, considering that the cleaning operation is completed (step S44).

The cleaning warning flag CLAF is cleared (step S45), and an exposure counter EXPC (to be described later) is also cleared. The exposure counter EXPC serves to store the number of times that a magnetic recording/reproducing operation is performed, counted from a predetermined time point, to determine a cleaning warning period (step S46). After these flags are stored in the EEPROM 4 (step S47), the magnetic heads 12a and 12b are withdrawn from the cleaning film 18 (to be referred to as "head OFF" hereinafter) (step S48). A cleaning film rewind sequence (step S49) is executed to completely rewind the cleaning film 18 into the film magazine 9. Thereafter, the cleaning status display of the display unit 2 is turned off (step S50), and the flow returns to the main routine (step S51).

The magnetic heads 12a and 12b are withdrawn before the cleaning film rewind operation, as described above, in order to prevent wear of the magnetic heads 12a and 12b owing to unnecessary cleaning.

If it is determined in step S35 that no rise signal from the WPR 27 is detected (NO), the timer is counted down (step S52). It is then checked whether the timer count is zero (step S53). If the timer count is not zero (NO), it is checked whether BKSW 26 is ON (step S54). If the BKSW 26 is OFF (NO), the flow returns to step S35. If the BKSW 26 is ON (YES), it means that the rear cover is open. Therefore, in order to quickly stop the motor M1, the motor M1 is decelerated (step S55) and is turned off (step S56). After "head OFF" is performed (step S57), the flow advances to step S50 to turn off the cleaning status display of the display unit 2.

As described above, when the rear cover is open, a cleaning film feed operation by the motor M1 is quickly stopped, and the magnetic heads 12a and 12b are withdrawn, thereby preventing uneven wear of the magnetic head surfaces due to uneven contact of the magnetic heads 12a and 12b with the cleaning film 18.

If it is determined in step S53 that the timer count is zero (YES), in order to quickly stop the rotation of the motor M1, the motor M1 is decelerated (step S58) and is turned off (step S59). After "head OFF" is performed (step S60), it is checked whether the count value of the cleaning counter CLC is "0" (step S61). If it is determined in step S61 that the count value is not "0" (NO), the previously set cleaning status flag OCLJF is cleared (step S62), and the cleaning status flag CLJF is also cleared (step S63). The flow then shifts to the subroutine "cleaning film rewind processing" (step S49). This operation is performed because it is determined that the reason why the timer count is zero despite the "film advance" operation corresponding to more than one frame is that the cleaning film is wound up to its end.

If it is determined in step S61 that the count value of the cleaning counter CLC is "0" (YES), it is checked whether the previously set cleaning status flag OCLJF is "1" (step S64) to determine whether to perform a re-feed operation. When this cleaning sequence is executed for the first time, NO is obtained in step S64 because the flag OCLJF is cleared in step S25.

Subsequently, the flag OCLJF (step S65) is set to "1", and a value obtained by subtracting a value α (a proper value stored in the EEPROM) from a predetermined count is transferred to the perforation counter PFC (step S66). A subroutine "cleaning film re-feed processing" (to be described later with reference to FIG. 5) is executed (step S67). The flow then returns to step S27 to execute the cleaning subroutine again. If it is determined in step S64 that the previously set cleaning status flag OCLJF is "1" (YES), it means that a "film advance" operation could not be performed despite the execution of cleaning. Therefore, the film rewind operation in step S49 is performed.

Figure 5:
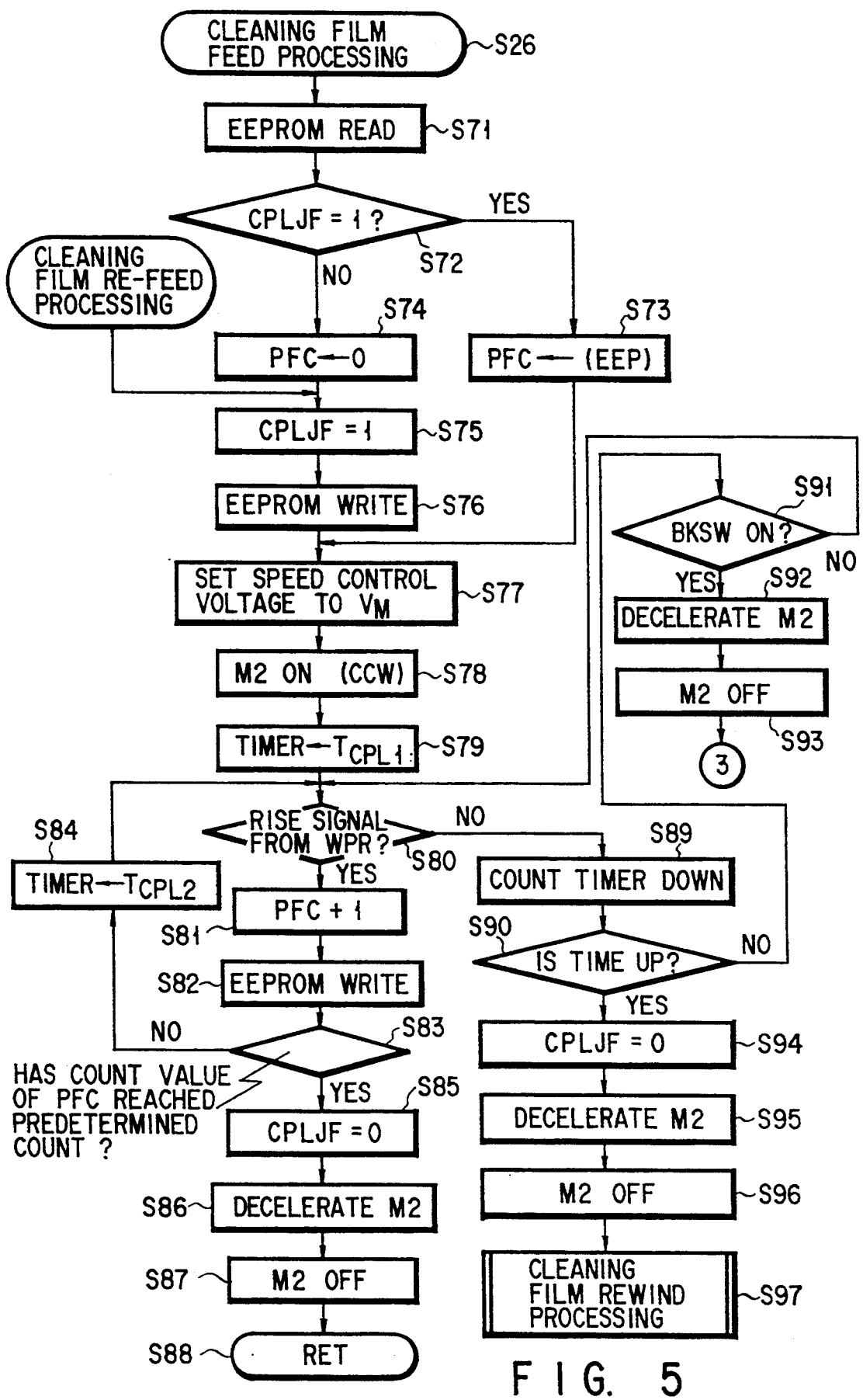
FIG. 5 is a flow chart showing a subroutine "cleaning film feed processing"

The subroutines "cleaning film feed processing" and "cleaning film re-feed processing" will be described next with reference to FIG. 5.

Figure 3A:
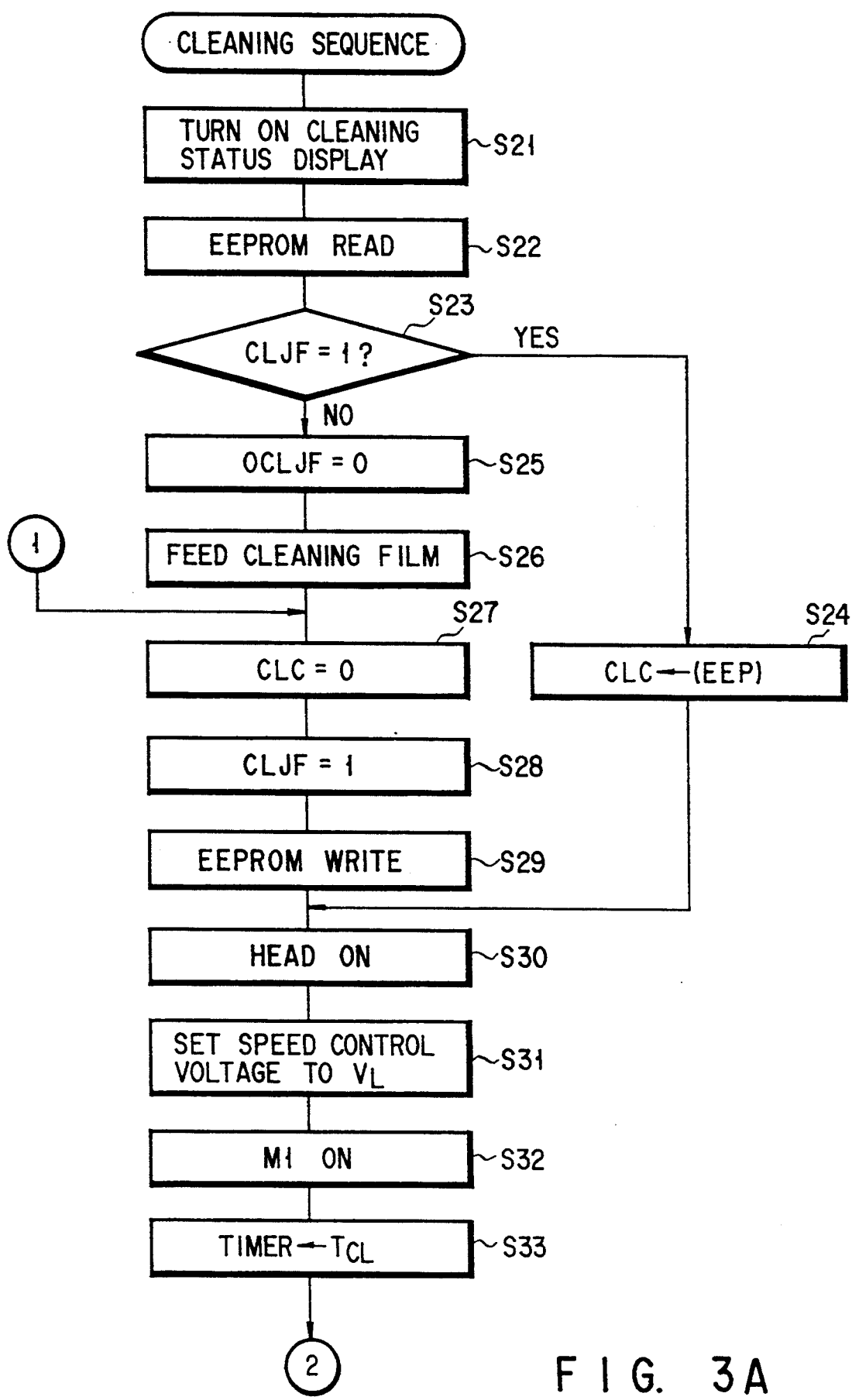
FIGS. 3A and 3B are flow charts showing the half of the cleaning operation shown in FIG. 2.
Figure 3B:
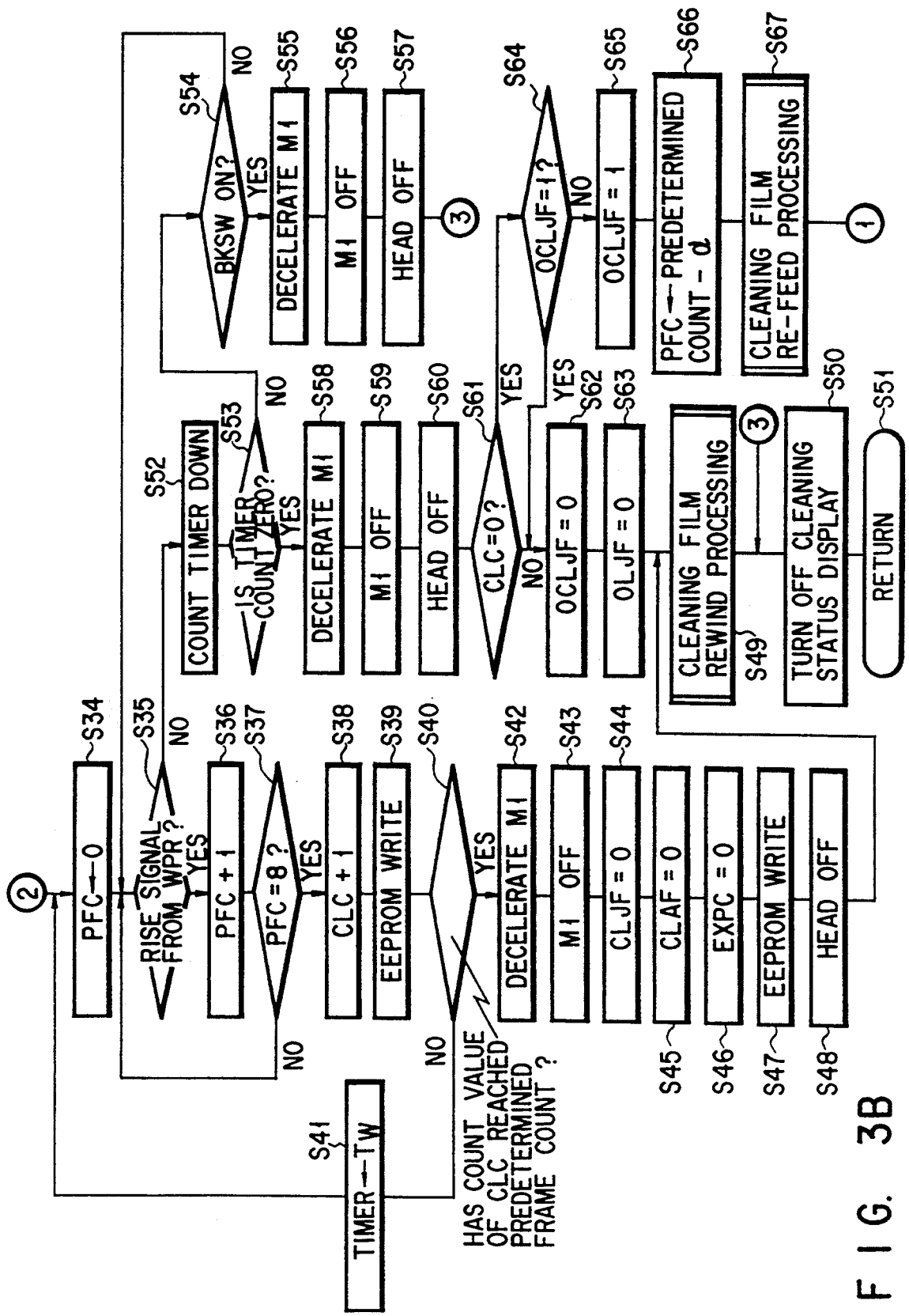

The subroutine "cleaning film feed processing" is a flow chart for executing step S26 shown in FIG. 3A in the cleaning subroutine. More specifically, this subroutine is a flow chart for winding the cleaning film 18 around the spool 17 by rotating the motor M2 counterclockwise in the execution of cleaning. The subroutine "cleaning film re-feed processing" is a routine for re-feeding the cleaning film 18 if the film is not wound even by one frame despite the execution of "cleaning film feed processing".

First, data is read out from the EEPROM 4 (step S71). A cleaning film feed status flag CPLJF is then checked (step S72). If this flag CPLJF is "1" (YES), since it means that the cleaning film is being fed, the perforation count value stored in the EEPROM 4 is transferred to the perforation counter PFC (step S73). If the flag CPLJF is "0" (NO), the perforation counter PFC is cleared (step S74), and the cleaning film feed status flag CPLJF (step S75) is set to "1". Thereafter, the data indicated by the perforation counter PFC and the flag CPLJF are written in the EEPROM (step S76). With the above step, the initial processing is completed.

The speed control voltage of the motor control circuit 5 is set to be a voltage value $V_M$ so as to set a feed speed at which the cleaning film 18 can be smoothly fed from the film magazine 9 (step S77). when the motor M2 is rotated counterclockwise (step S78), a film feed coupler in FIG. 4 is rotated by a driving mechanism (not shown), and the film is fed from the spool 9a.

In this case, the speed control voltage, of the motor control circuit 5, which determines the rotational speed of the motor, i.e., a film feed speed, has the voltage value $V_M$ for a normal wind-up speed, a voltage value $V_L$ for a low film feed speed lower than the normal wind-up speed, and a voltage value $V_H$ for a high film feed speed higher than the normal wind-up speed.

Subsequently, a time $T_{CPL1}$ is set in the timer, which time is long enough to allow the film 18 to reach the WPR 27 after it is fed from the film magazine 9 (step S79).

A rise signal from the WPR 27 is checked (step S80). If the rise signal is detected (YES), "1" is added to the count value of the perforation counter PFC (step S81). This updated perforation count value is written in the EEPROM (step S82), and it is checked whether the count value of the perforation counter PFC has reached a predetermined count (step S83). If the value recorded on the perforation counter PFC has not reached the predetermined count (NO), since the film has reached the WPR 27 at this time point, a time $T_{CPL2}$ shorter than the time $T_{CPL1}$ is set in the timer (step S84), and the flow returns to step S80 again.

If the count value of the perforation counter PFC has reached the predetermined count (YES), since the cleaning film 18 has already been fed to such an extent that the film is wound around the spool 17, the flag CPLJF is cleared (step S85), and the motor M2 is decelerated (step S86). Thereafter, the motor M2 is turned off (step S87). The flow returns to the main routine (step S88).

If no rise signal from the WPR 27 is detected (NO) in step S80, the timer is counted down (step S89), and it is checked whether the timer count is zero (step S90). If the timer count is not zero (NO), it is checked whether the BKSW 26 is ON (step S91). If the BKSW 26 is ON (YES), the motor M2 is decelerated (step S92) and is turned off (step S93). The flow then returns to the cleaning sequence.

If the BKSW 26 is OFF (NO), the flow returns to step S80 again. Since the processing speed of the microcomputer is faster than a speed at which a signal from the WPR 27 is input, a loop of steps S80, S89, S90, S91, and S80 is normally repeated.

If it is determined in step S89 that the timer has run out (YES), it is determined that the cleaning film feed operation is not completed, and the flag CPLJF is reset (step S94). The motor M2 is decelerated (step S95) and is turned off (step S96). Thereafter, the flow shifts the subroutine "cleaning film rewind processing" (step S97).

As described above, even if the rear cover is erroneously opened during a film feed operation, the rotation of the motor is quickly stopped by the processing in steps S91 to S93 to stop the film feed operation, thereby preventing continuous feeding of the cleaning film while the rear cover is open. When the rear cover is closed, a rise signal from the BKSW 26 is detected in step S6, and a cleaning film is determined. Since the flag CLJF for the cleaning sequence is not set, a cleaning film feed operation is executed again in step S26 shown in FIG. 3A.

Figure 6:
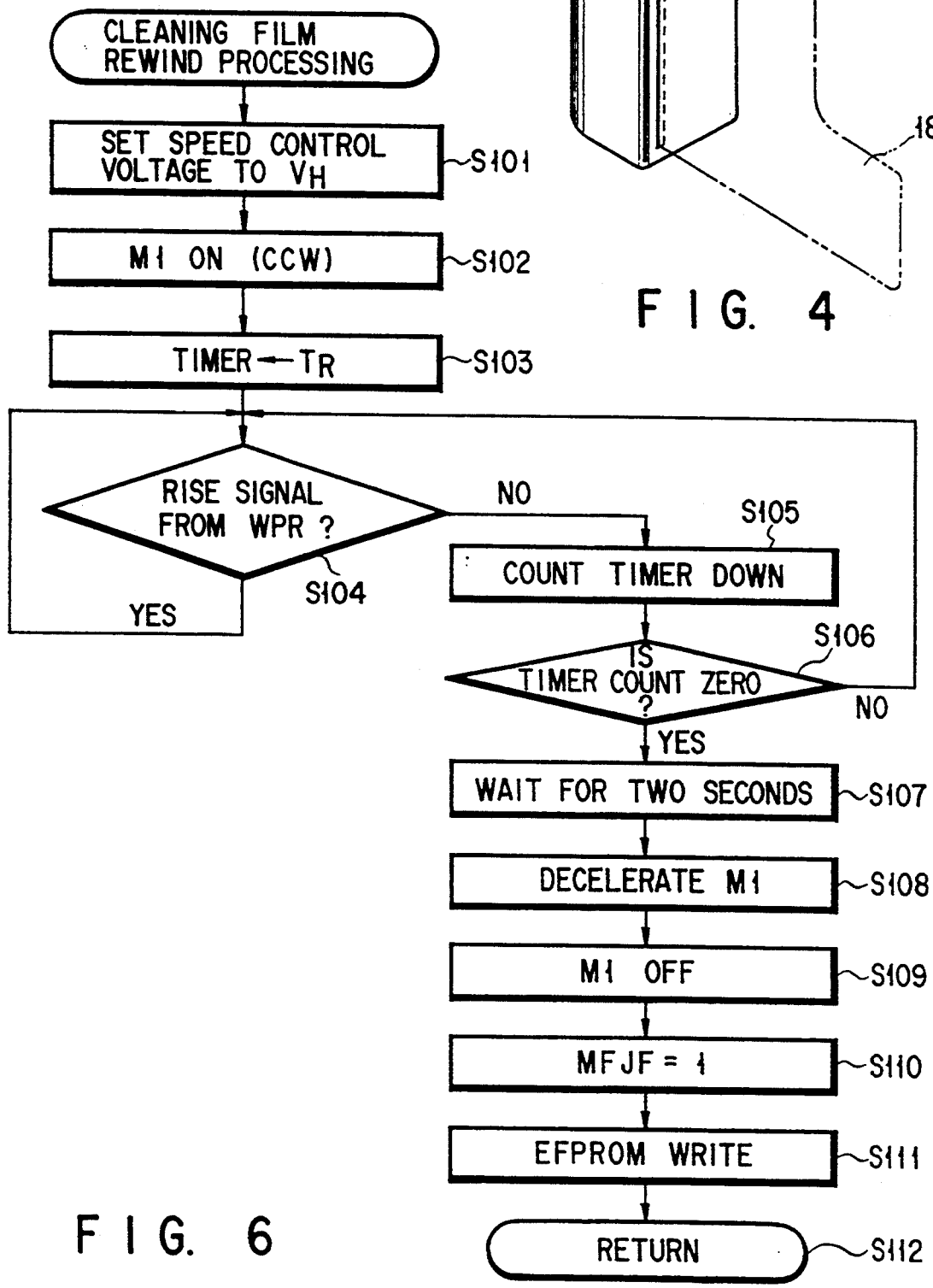
FIG. 6 is a flow chart showing a subroutine "cleaning film rewind processing"

The subroutine "cleaning film rewind processing" will be described next with reference to the flow chart shown in FIG. 6.

The voltage set value (speed control voltage) of the motor control circuit 5 is set to the high voltage $V_H$ to increase the feed speed (step S101). Such a voltage setting is employed for the following reason. As described above, before the flow shifts to the cleaning film rewind sequence, the magnetic heads 12a and 12b are always withdrawn and separated from the surface of the cleaning film 18. Even if, therefore, the feed speed is increased, the magnetic heads 12a and 12b are free from damage, and the time required to rewind the cleaning film 18 can be shortened.

The motor M1 is rotated counterclockwise (step S102), and a time $T_R$ required for a film rewind operation is set in the timer (step S103).

The presence/absence of a rise signal from the WPR 27 is checked (step S104). If the rise signal is detected (YES), the flow returns to step S104, and this state is maintained while the rise signal is detected. If a rise signal from the WPR 27 is not detected (NO), the countdown of the timer is started (step S105). It is then checked whether the timer count is zero (step S106). If the timer count is not zero (NO), the flow returns to step S104. If the timer count is zero (YES), the flow waits for a period of time required to completely rewind the film into the film magazine, e.g., two seconds, considering that the film rewind operation is almost completed (step S107). After this period of time elapses, the motor M1 is decelerated (step S108) and turned off (step S109). A rewind completion flag MFJF is set to "1" (step S110), and the corresponding data is written in the EEPROM (step S111). Thereafter, the flow returns to the main routine.

FIG. 7 shows the segment arrangement of a frame count display of an LCD. FIGS. 8A and 8B show a warning of cleaning displayed on the LCD. FIGS. 8C and 8D show a cleaning status display.

In the segment arrangement of the LCD shown in FIG. 7, segments used for a warning of cleaning or a cleaning status display are displayed black. This LCD 30 generally serves to display various modes of the camera, a frame count, and the like by turning on or flickering segments. In this embodiment, a warning of cleaning and a cleaning status are not displayed by independent display portions but are displayed by combinations of segments used for a frame count display. With this arrangement, the LCD area can be reduced, and a signal line can be commonly used for the respective displays. FIG. 7 shows a display sample displaying the first two letters "C" and "L" of "CLEANING".

The above-mentioned display of a warning of cleaning is a display indicating that cleaning is required because the surfaces of the magnetic heads 12a and 12b are contaminated by a cut magnetic substance. When the cleaning warning flag CLAF is "1", this warning is displayed to the user. The degree of contamination may be determined on the basis of the number of times that a magnetic recording/reproducing operation is performed, specifically the number of frames which have undergone magnetic recording/reproduction, the number of times that a photographic film is replaced, the number of times that a film rewind operation is performed, or the like.

The cleaning status display serves to display through the display unit 2 that the above-described cleaning operation is being performed. Assume that a warning of cleaning and a cleaning status are respectively displayed by flickering and turning on the corresponding segments using the display pattern shown in FIG. 7 in accordance with the flow chart in the first embodiment. In this case, the display of a warning of cleaning is shown in FIGS. 8 (a) and (b), and the cleaning status display is shown in FIGS. 8 (c) and (d). With these displays, the user of the camera can clearly recognize the meaning of each display.

The subroutine "release processing" in which a cleaning warning flag is set depending on the number of times of photography will be described with reference to the flow chart shown in FIG. 9.

Data required for arithmetic processing is loaded from the EEPROM 4 (step S120), and the contents of the EEPROM 4 are transferred to the exposure counter EXPC (step S121). The exposure counter EXPC indicates the number of times that exposure is performed after a photographic film is loaded. The count value of the exposure counter EXPC is set to be "0" when the camera is shipped. The exposure counter EXPC is not counted up when a release operation is performed without a film (demonstrating operation).

A film sensitivity is read from the film magazine 9 through the film sensitivity reader 6 (step S122). Distance measuring and photometric operations are respectively performed by the distance measuring unit 20 and the photometric unit 21 (step S123), thus obtaining a distance measurement value and a brightness value. A lens extension amount and an exposure time are calculated from the obtained distance measurement and brightness values, respectively (step S124).

The motor M2 is rotated clockwise to extend the focusing lens 14 (step S125). In this operation, pulses generated by the lens drive detector 15 are counted by the microcomputer 1. When this pulse count reaches a pulse count corresponding to the extension amount calculated in step S124, the motor M2 is stopped. Note that in a single-lens reflex camera, a mirror-up operation is performed in this case.

Subsequently, a signal is supplied to the sector driver 8 to drive the sector 10, thus performing exposure (step S126). Note that a signal is supplied to the electronic flag controller 22 as needed to emit flash light. Upon completion of exposure, the magnetic heads 12a and 12b are brought into contact with the magnetic track portion of the photographic film 18 (step S127). In order to set a film feed speed higher than that in the cleaning mode, the voltage set value of the motor is set to the speed control voltage $V_H$ higher than the voltage set value in the cleaning mode (step S128). By driving the motor M1 using this speed control voltage $V_H$, the normal film wind-up speed (2 frames/second) can be obtained.

While the motor M1 is rotated to perform a film wind operation (step S129), each photographic data is recorded (step S130). After the film wind operation and the data write operation are completed, "1" is added to the count value of the exposure counter EXPC (step S131). The resultant value is written in the EEPROM (step S132), and the magnetic heads 12a and 12b are withdrawn from the photographic film 18 (step S133). It is then checked whether the count value of the exposure counter EXPC has reached a predetermined number of times of photography which is set in the camera (step S134). If the count value has not reached the predetermined number of times (NO), the flow returns to the main routine after a lens reset operation is performed (step S135). If the count value has reached the predetermined number of times (YES), the cleaning warning flag CLAF is set to "1" (step S136), and the flow returns to the main routine.

If the number of times of exposure is counted by the exposure counter EXPC, and the cleaning warning flag CLAF is set depending on the count value in this manner, a warning of cleaning can be displayed on the display unit 2 within the sequence in the first embodiment.

In this embodiment, the exposure counter EXPC is updated each time one frame picture is take. However, the exposure counter EXPC may be updated on the basis of the number of film cartridges (e.g. one cartridge contains 24 films), and the warning may be issued when the number of film cartridges has reached a predetermined value.

As has been described above, according to the camera using a film having a magnetic recording portion, necessity to clean the magnetic heads is determined by checking whether the number of times of a film feed operation or photographic operation has reached a predetermined count. If it is determined that cleaning is required, a warning of necessity of cleaning is provided with a warning display using an LCD or the like or a warning sound. Alternatively, a photographic operation may be inhibited until a cleaning operation is completed.

As has been described in detail above, according to the present invention, there is provided a camera using a film having a magnetic recording portion, which allows easy determination of the contaminated states of the magnetic recording heads, and can prevent recording/reproduction errors due to contamination of the heads.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera using a film having a magnetic recording portion, comprising:
   a magnetic head for recording photographic data on said magnetic recording portion;
   cleaning film detecting means for detecting that a cleaning film for cleaning said magnetic head is loaded;
   cleaning control means for cleaning said magnetic head by using said cleaning film when said cleaning film detecting means detects that said cleaning film is loaded;
   storage means for counting frames which have undergone photography and storing a cumulative frame count;
   comparing means for comparing the cumulative frame count stored in said storage means with a predetermined value;
   means for performing a warning display or inhibiting a release operation when said comparing means determines that the cumulative frame count exceeds the predetermined value; and
   reset means for resetting the cumulative frame count stored in said storage means upon completion of the cleaning operation.

2. A camera according to claim 1, wherein said cleaning means winds said cleaning film by a predetermined amount while said cleaning film is urged against said magnetic head, and rewinds said cleaning film after said cleaning film is wound by the predetermined amount.

3. A camera according to claim 1, wherein the warning display is performed using display means for displaying a frame count.

4. A camera in which a cleaning film and a film having a magnetic recording portion are selectively loaded, comprising:

magnetic head means for recording/reproducing data on/from said magnetic recording portion of said film;

count means for counting frames which have undergone photography;

storage means for accumulating and storing a frame count obtained by said count means after said magnetic head means is cleaned by said cleaning film;

comparing means for comparing a cumulative frame count stored in said storage means with a predetermined value;

display means for performing a warning display when said comparing means detects that the cumulative frame count exceeds the predetermined value; and reset means for resetting the cumulative frame count stored in said storage means after the cleaning operation is performed.

5. A camera according to claim 4, wherein said storage means is a nonvolatile memory for electrically programmably storing data by using electrical signals.

6. A camera according to claim 4, further comprising inhibiting means for inhibiting a release operation when said comparing means detects that the cumulative frame count exceeds the predetermined value.

7. A camera according to claim 4, further comprising film type discriminating means for detecting whether a loaded film is a cleaning film for cleaning said magnetic head, so that when said film type discriminating means detects that a loaded film is a cleaning film, a cleaning operation of said magnetic head is executed.

8. A camera according to claim 7, wherein said cleaning film is fed at a low speed during an initial period of the cleaning operation, and is fed at a high speed during a cleaning film rewind operation.

9. A camera according to claim 7, further comprising feed amount detecting means for measuring a feed amount of a film, so that a film rewind operation is executed when said feed amount detecting means detects that said cleaning film is fed by a predetermined amount.

10. A camera using a film having a magnetic recording portion, comprising:

magnetic storage/reproduction means for storing and/or reproducing data in/from said magnetic recording portion;

cleaning means for cleaning said magnetic storage/reproduction means;

calculating means for calculating a cumulative frame count after cleaning is performed by said cleaning means;

storage means for storing the cumulative frame count calculated by said calculating means; and means for performing a warning display or inhibiting a photographic operation when the cumulative frame count exceeds a predetermined value.

11. A camera according to claim 10, wherein said magnetic storage/reproduction means includes a magnetic head, and said cleaning means performs cleaning by causing a cleaning film to travel on said magnetic head.

12. A camera using a film having a magnetic recording portion, comprising:

magnetic storage/reproduction means for storing and/or reproducing data in/from said magnetic recording portion;

cleaning means for cleaning said magnetic storage/reproduction means;

calculating means for calculating a cumulative frame count after cleaning is performed by said cleaning means;

storage means for storing the cumulative frame count calculated by said calculating means, the cumulative frame count stored in said storage means being reset when cleaning is executed by said cleaning means; and means for performing a warning display or inhibiting a photographic operation when the cumulative frame count exceeds a predetermined value.

13. A camera using a film having a magnetic recording portion, comprising:

a magnetic head for storing and/or reproducing data in and/or from said magnetic recording portion;

film type discriminating means for determining whether a loaded film is a cleaning film for cleaning said magnetic head; and cleaning means capable of executing a cleaning operation of said magnetic head when said film type discriminating means determines that the loaded film is a cleaning film, wherein said cleaning means sets a wind-up speed of said cleaning film during the cleaning operation to be lower than a normal film wind-up speed.

14. A camera according to claim 13, further comprising loading operation detecting means for detecting that a film is loaded, so that when said loading operation detecting means detects that a film is loaded, said film type discriminating means is operated.

15. A camera according to claim 13, further comprising storage means for storing a cumulative frame count, counted from the end of the cleaning operation, and determining means for determining whether the cumulative frame count stored in said storage means exceeds a predetermined value.

16. A camera according to claim 15, further comprising display means for performing a warning display when said determining means determines that the cumulative frame count exceeds the predetermined value.

17. A camera according to claim 15, further comprising inhibiting means for inhibiting a photographic operation when said determining means determines that the cumulative frame count exceeds the predetermined value.

18. A camera using a film having a magnetic recording portion, comprising:

a magnetic head which is brought into contact with said film;

write control means for controlling a data write operation of said magnet head with respect to said film;

count means for accumulating a value corresponding to a cumulative number of uses of said magnetic head by said write control means;

comparing means for comparing a cumulative value obtained by said count means with a predetermined value, and generating an output when the cumulative value and the predetermined value exhibit a predetermined relationship; and display means for performing a warning display in response to an output from said comparing means.

19. A camera according to claim 18, wherein said write control means causes said magnetic head to perform a write operation while said film is fed after an exposure operation of said camera is performed, and said count means accumulates the number of times that the exposure operation is performed.

20. A camera according to claim 18, wherein said count means accumulates the number of times that said film having said magnetic recording portion is loaded in said camera.

21. A camera according to claim 18, wherein said display means also serves as display means used in a normal operation of said camera.

22. A camera according to claim 18, wherein a photographic operation start signal input to said camera is disabled in response to the output from said comparing means.

23. A camera using a film having a magnetic recording portion, comprising:
- a magnetic head which is brought into contact with said film;
- feed start signal output means for outputting a signal for instructing to start a feed operation of said film after said film is loaded;
- determining means for determining whether said loaded film is a cleaning film for cleaning said magnetic head; and
- film feed means, started to operate in response to an output from said feed start signal output means, for performing a feed operation for cleaning said magnetic head when said determining means determines that said loaded film is a cleaning film, and performing a normal film feed operation when said determining means determines that said loaded film is not a cleaning film, wherein said film feed means sets a feed speed of said cleaning film to be lower than the normal film feed speed.

24. A camera according to claim 23, wherein a cleaning operation display is performed during the cleaning operation.

25. A camera using a film having a magnetic recording portion, comprising:
- a magnetic head which is brought into contact with said film;
- control means for recording data associated with photography on said film by using said magnetic head while said film is fed;
- storage means for accumulating/storing a value corresponding to a cumulative number of uses of said magnetic head; and
- display means for displaying a moment which requires magnetic head cleaning in accordance with the cumulative value stored in said storage means.

26. A camera according to claim 25, wherein said storage means also stores the number of times of exposure operations executed by said camera.

27. A camera according to claim 25, wherein said display means also serves as display means used in a normal operation of said camera.

28. A camera according to claim 25, wherein a photographic operation start signal input to said camera is disabled in accordance with a cumulative value stored in said storage means.

29. A camera using a film having a magnetic recording portion, comprising:
- a magnetic head which is brought into contact with said film;
- control means for recording data associated with photography on said film by using said magnetic head while said film is fed;
- storage means for accumulating/storing data representing the number of accumulated loadings of cartridges having magnetic recording portions in said camera; and
- display means for displaying a moment which requires magnetic head cleaning in accordance with a cumulative value in said storage means.

30. A camera according to claim 29, wherein said display means also serves as display means used in a normal operation of said camera.

31. A camera according to claim 29, wherein a photographic operation start signal input to said camera is disabled in accordance with a cumulative value in said storage means.

32. A camera using a film having a magnetic recording portion, comprising:
- a magnetic head which is brought into contact with said film;
- storage means for accumulating a value corresponding to a cumulative number of uses of said magnetic head;
- cleaning period determining means for determining a moment which requires magnetic head cleaning in accordance with a cumulative value in said storage means;
- cleaning film determining means for determining whether a film loaded in said camera is a cleaning film for cleaning said magnetic head; and
- display means for performing a display in a first form in response to an output from said cleaning period determining means, and performing a display in a second form in response to an output from said cleaning film determining means.

33. A camera according to claim 32, wherein said storage means accumulates/stores data representing the number of times that an exposure operation is executed by said camera.

34. A camera according to claim 32, wherein said display means also serves as display means used in a normal operation of said camera.

35. A camera using a film having a magnetic recording portion, comprising:
- a magnetic head which is brought into contact with said film;
- control means for switching between a first operation mode in which data associated with photography is recorded on said film by said magnetic head while said film is fed, and a second operation mode for cleaning said magnetic head; and
- display means for displaying at least data associated with photography in the first operation mode, and displaying that a cleaning operation is performed in the second operation mode.

36. A camera according to claim 35, wherein said control means switches between the first and second operation modes in accordance with a type of film loaded in said camera.

37. A camera using a film having a magnetic recording portion, comprising:
- a magnetic head which is brought into contact with said film;
- determining means for determining whether said film loaded in said camera is a cleaning film for cleaning said magnetic head;
- film feed means for, when said determining means determines that said film is a cleaning film, for winding said cleaning film, and subsequently rewinding said cleaning film; and
- magnetic head driving means for bringing said magnetic head into contact with said cleaning film during a film wind operation of said film feed means, and withdrawing said magnetic head from said cleaning film during the film rewind operation.

38. A camera according to claim 37, wherein said feed means sets a feed speed in a film wind operation of said cleaning film to be lower than a feed speed in a film rewind operation of said cleaning film.

39. A camera according to claim 37, further comprising display means for performing a predetermined display during a film wind operation of said cleaning film.

40. A camera using a film having a magnetic recording portion, comprising:

a magnetic head which is brought into contact with said film;

feed start signal output means for outputting a signal for instructing to start a feed operation of said film after said film is loaded;

determining means for determining whether said loaded film is a cleaning film for cleaning said magnetic head; and display means for performing a display when said determining means determines that said loaded film is a cleaning film.

41. A camera according to claim 40, wherein a photographic operation start signal input to said camera is disabled when said determining means determines that said loaded film is a cleaning film.

42. A camera using a film having a magnetic recording portion, comprising:

a magnetic head which is brought into contact with said film;

feed start signal output means for outputting a signal for instructing to start a feed operation of said film after said film is loaded;

determining means for determining whether said loaded film is a cleaning film for cleaning said magnetic head;

control means for executing a cleaning operation of cleaning said magnetic head when said determining means determines that said loaded film is a cleaning film; and display means for performing a cleaning operation display during the cleaning operation.

43. A camera according to claim 42, wherein a photographic operation start signal input to said camera is disabled during the cleaning operation.

* * * * *